(12) United States Patent
Lee

(10) Patent No.: US 9,610,649 B2
(45) Date of Patent: Apr. 4, 2017

(54) SPOT WELDING SYSTEM AND OPERATION METHOD FOR THE SAME

(71) Applicant: Hyundai Motor Company, Seoul (KR)

(72) Inventor: Hyunwoo Lee, Ulsan (KR)

(73) Assignee: Hyundai Motor Company, Seoul (KR)

( * ) Notice: Subject to any disclaimer, the term of this patent is extended or adjusted under 35 U.S.C. 154(b) by 266 days.

(21) Appl. No.: 14/489,864

(22) Filed: Sep. 18, 2014

(65) Prior Publication Data

US 2015/0183050 A1    Jul. 2, 2015

(30) Foreign Application Priority Data

Dec. 31, 2013  (KR) .......................... 10-2013-0168970

(51) Int. Cl.
| | | |
|---|---|---|
| *B23K 11/31* | (2006.01) | |
| *B23K 11/11* | (2006.01) | |
| *B23K 37/02* | (2006.01) | |
| *B23K 37/04* | (2006.01) | |

(52) U.S. Cl.
CPC ............. *B23K 11/314* (2013.01); *B23K 11/11* (2013.01); *B23K 11/115* (2013.01); *B23K 37/02* (2013.01); *B23K 37/0408* (2013.01)

(58) Field of Classification Search
CPC ......... B23K 11/11; B23K 11/31; B23K 37/02; B23K 37/04
USPC ................................................ 219/86.1, 91.2
See application file for complete search history.

(56) References Cited

U.S. PATENT DOCUMENTS 4,734,555 A * 3/1988 Ferguson ............. B23K 11/253
                                                           219/109
4,831,228 A * 5/1989 Schumacher .......... B23K 11/31
                                                           219/86.22

FOREIGN PATENT DOCUMENTS

| CN | 202264019 U | 6/2012 |
|---|---|---|
| JP | 06-182563 A | 7/1994 |

* cited by examiner

*Primary Examiner* — Samuel M Heinrich
(74) *Attorney, Agent, or Firm* — Mintz Levin Cohn Ferris Glovsky and Popeo, P.C.; Peter F. Corless

(57) ABSTRACT

A spot welding system is disclosed. In particular, the spot welding system includes an upper moving unit provided with an upper electrode and a lower moving unit mounted separately from the upper moving unit and provided with a lower electrode corresponding to the upper electrode. Together, the upper moving unit and the lower moving unit separately vary a position of the lower electrode to allow for reduced size restrictions of objects to be spot welded therein.

15 Claims, 4 Drawing Sheets

SPOT WELDING SYSTEM AND OPERATION
METHOD FOR THE SAME

CROSS-REFERENCE TO RELATED
APPLICATION

This application claims priority to and the benefit of Korean Patent Application No. 10-2013-0168970 filed in the Korean Intellectual Property Office on Dec. 31, 2013, the entire contents of which are incorporated herein by reference.

BACKGROUND OF THE INVENTION (a) Field of the Invention lo The present invention relates to a spot welding system and an operation method for the same. More particularly, the present invention relates to a spot welding system and an operation method for the same may increase the speed at which a spot weld may be completed regardless of size of panels through the use of separated upper and lower welding electrodes.

(b) Description of the Related Art

In general, several parts such as panels, roofs, pillars, side panels, flanges of opening portions for a vehicle body door and so on, are bonded by spot welding in the assembly line of a vehicle body factory. Spot welding is a welding method of bonding objects via a small concentrated weld, using electric resistance by applying electricity and pressure to weld together portions that overlap.

A spot welding device, for example C-type welding gun, is used for spot welding and typically includes a fixed electrode and a moving electrode on a gun body. The spot welding device performs spot welding on an object to weld, using electric resistance by pressing the object to weld supported on the fixed electrode, operating the movable electrode with an actuator, and applying electric resistance to the fixed electrode and the moving electrode.

However, the upper electrode and the lower electrode are connected by a welding gun arm, thus the size of the panel for welding is limited by distance between the welding electrodes and the welding gun.

Increasing entire size of the welding gun may overcome the above drawback, but welding gun may then be too big and heavy to manage. Thus, mounting the welding gun to a robot or operating the welding gun may be restricted, and welding speed may deteriorate. Thus, numbers of robots, costs for facilities, maintenance expenditure, space for equipment and so on may be increased.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a spot welding system and an operation method for the same having advantages of implementing spot weld with high speed regardless of the size of panels by utilizing by separating the upper and lower welding electrodes.

Also, the present invention has been made in an effort to provide a spot welding system and an operation method for the same having advantages of reducing numbers of robots, costs for facilities, maintenance expenditure, space for equipment and so on.

Also, the present invention has been made in an effort to provide a spot welding system and an operation method for the same having advantages of improving productivity and efficiency of welding.

A spot welding system according to one or a plurality of exemplary embodiments of the present invention may include an upper moving unit provided with an upper electrode and configured and disposed to vary a position of the upper electrode, and a lower moving unit mounted separately from the upper moving unit, provided with a lower electrode corresponding to the upper electrode, and configured and disposed to vary a position of the lower electrode.

The upper moving unit may include a welding gun where the upper electrode is mounted through a pushing unit and a robot where the welding gun is mounted thereto. The robot configured to vary a position of the welding gun.

The pushing unit may include a gear box mounted to the welding gun, a pushing actuator mounted to a lower portion of the gear box, and a first moving block where the upper electrode is mounted, mounted to the lower portion of the gear box. The first moving block selectively moves up and down by an operation of the pushing actuator.

The lower moving unit may include a table, length direction moving members disposed on both ends of the table along length direction of the table, and a width direction moving member connected to the length direction moving member, moved along the length direction of the table by an operation of the length direction moving members, of which the lower electrode is mounted thereto, and the width direction moving member movable along width direction of the table.

The length direction moving member may include a first screw shaft disposed on both ends of the table along length direction of the table respectively, a second moving block engaged with and movable along the each first screw shaft, and a first motor (e.g., a servo motor) mounted to a side of the table and selectively rotating the first screw shaft. The first motor may be mounted and configured to supply torque to the each first screw shaft on each side of the table respectively.

The width direction moving member may include a second motor, a second screw shaft connected with each of the second moving blocks along the width direction of the table and a third moving block engaged with and movable along the second screw shaft. In particular, the lower electrode is mounted to the third moving block, and the second motor may be mounted to the third moving block and selectively rotates the second screw shaft. More specifically, the lower electrode may be mounted to the third moving block through a cylinder so as to be selectively moved up and down.

The upper and lower moving units may be configured to communicate with a controller configured to control operations of the upper and lower moving units. The controller may synchronize positions of the upper electrode and lower electrode, detect a signal from an encoder of the first and second motors, and then synchronize positions of the upper and lower moving units according to the detected signal.

A operation method for a spot welding system including an upper moving unit provided with an upper electrode and configured to vary a position of the upper electrode and a lower moving unit mounted separately from the upper moving unit, provided with a lower electrode corresponding to the upper electrode, and configured to vary a position of the lower electrode is also provided. In particular, the operation method for a spot welding system according to one or a plurality of exemplary embodiments of the present invention may include disposing a welding object between the upper electrode and the lower electrode, synchronizing positions of the upper and lower moving units by control of a controller configured to control operation of the upper moving unit and the lower moving unit, and moving the upper and lower moving units of which the positions are synchronized by according to signals received by the controller to welding points of the welding object for welding.

According to one or a plurality of exemplary embodiments of the present invention, spot weld may be implemented at high speeds regardless of size of panels by operating and disposing the upper and lower welding electrodes separately. Also, numbers of robots, costs for facilities, maintenance expenditure, space for equipment and so on may be reduced. Productivity and efficiency of welding may also be improved.

DESCRIPTION OF SYMBOLS

Figure 1:
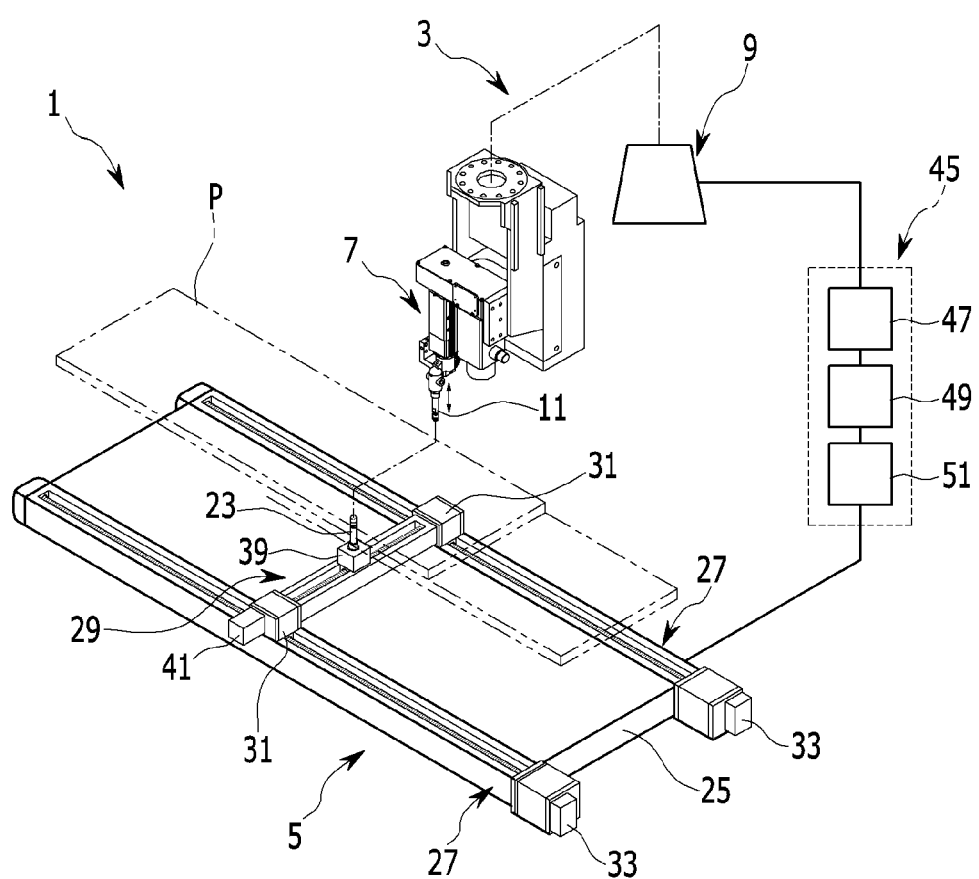
FIG. 1 is a perspective view of a spot welding system according to an exemplary embodiment of the present invention.

1: spot welding system
3: upper moving unit
5: lower moving unit
P: welding object
7: welding gun
9: robot
11: upper electrode
13: pushing unit
15: gear box
17: pushing actuator
19: first moving block
21: drive motor
23: lower electrode
25: table
27: length direction moving member
29: width direction moving member
31: second moving block
33: first servo motor
35: first screw shaft
37: second screw shaft
39: third moving block
41: second servo motor
43: cylinder
45: controller
47: first control portion
49: second control portion
51: third control portion

DETAILED DESCRIPTION OF THE EMBODIMENTS

In the following detailed description, only certain exemplary embodiments of to the present invention have been shown and described, simply by way of illustration.

However, the size and thickness of each component illustrated in the drawings are arbitrarily shown for ease of description and the present invention is not limited thereto, and the thicknesses of portions and regions are exaggerated for clarity.

Additionally, it is understood that the below control features are executed by at least one controller. The term "controller" refers to a hardware device that includes a memory and a processor configured to specifically execute one or more steps that should be interpreted as its algorithmic control structure. The memory is configured to store the algorithmic control structure and the processor is specifically configured to execute said algorithmic control steps to perform one or more processes which are described further below.

Further, in the following detailed description, names of constituents, which are in the same relationship, are divided into "the first", "the second", etc., but the present invention is not necessarily limited to the order in the following description.

FIG. 1 is a perspective view of a spot welding system according to an exemplary embodiment of the present invention. Referring to FIG. 1, a spot welding system 1 according to an exemplary embodiment of the present invention includes an upper moving unit 3 and a lower moving unit 5. During operation, a welding object P is inserted between the upper moving unit 3 and the lower moving unit 5 for welding. Supplying the welding object P between the upper and lower moving units 3 and 5 is performed by a robot, a panel moving apparatus and so on which is not intended part of the present invention. Additionally, those skilled in the in vehicle manufacturing industry would readily understand how to supply robotically the welding object P to the to present invention, and thus detailed description will be omitted.

The upper moving unit 3 is provided with a welding gun 7 and a robot 9 to which the welding gun is mounted. In particular, the robot 7 positions the welding gun 7 into its welding position. Scheme and operation of the robot 9 are well known in vehicle industry, and thus detailed description will be omitted. An upper electrode 11 of the welding gun 7 is mounted to a pushing unit 13, and the pushing unit 13 is mounted to the robot 9.

Figure 2:
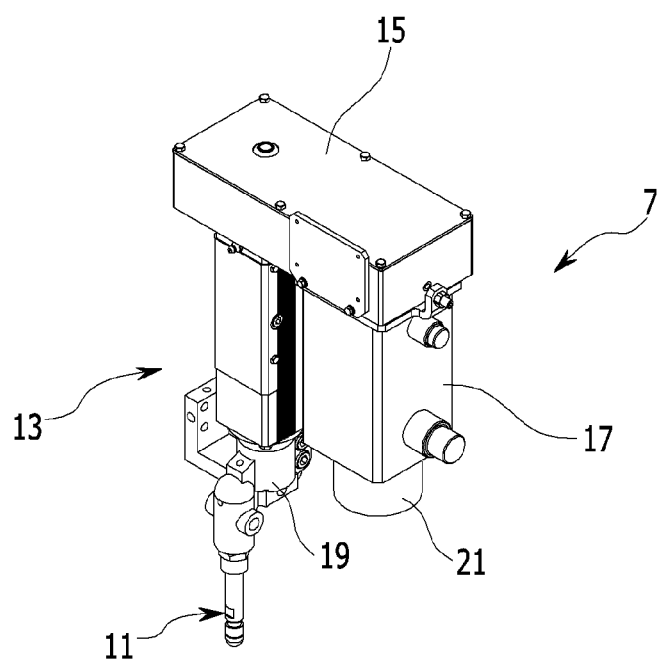
FIG. 2 is a perspective view of a pushing unit applied to a spot welding system according to an exemplary embodiment of the present invention.

FIG. 2 is a perspective view of a pushing unit applied to a spot welding system according to an exemplary embodiment of the present invention. Referring to FIG. 2, the pushing unit 13 includes a gear box 15, a pushing actuator 17 and a first moving block 19. The pushing actuator 17 is connected to a lower portion of the gear box 15, and the first moving block 19 is slidable up and down under the gear box 15 by operations of the pushing actuator 17 and the gear box 15. In the gear box 15, a plurality of gears are disposed for transferring driving torque of the pushing actuator 17 to move the first moving block 19 up and down. The pushing actuator 17 may be operated by a drive motor 21. The drive motor 21 may be a step motor or a servo motor configured to control rotation speed and rotating direction. The upper electrode 11 is mounted to the first moving block 19, and the first moving block 19 moves up and down by the operation of the pushing actuator 17 in welding process.

Meanwhile, the pushing actuator 17 may be a roller screw actuator configured to change rotation torque of the drive motor 21 to straight motion. The pushing actuator 17 may rotate a screw shaft (not shown) parallel to the pushing actuator 17 through the gear box 15 so as to move the first moving block 19 on the screw shaft up and down. The operation of a roller screw actuator which may be configured as the pushing actuator is well known in the vehicle industry, and thus detailed description will be omitted.

The robot 9 provide with the welding gun 7 may position the welding gun 7 to the welding point. The scheme and the operation of the robot 9 are well known to a person skilled in the art, and thus detailed description will be omitted. In this case, a multi axis moving apparatus may be configured as the robot 9.

Figure 3:
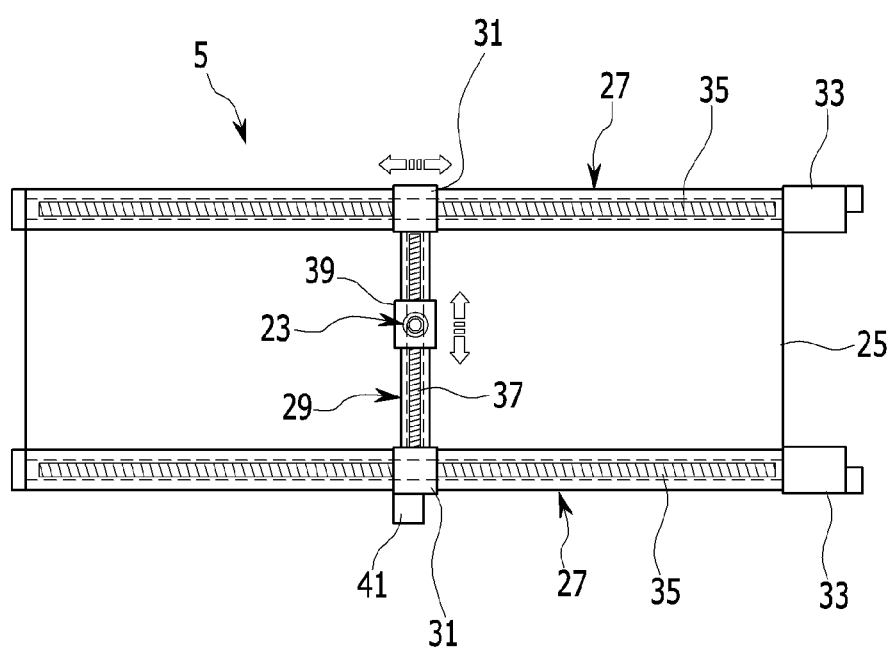
FIG. 3 is a top plan view of a lower moving unit applied to a spot welding system according to an exemplary embodiment of the present invention.
Figure 4:
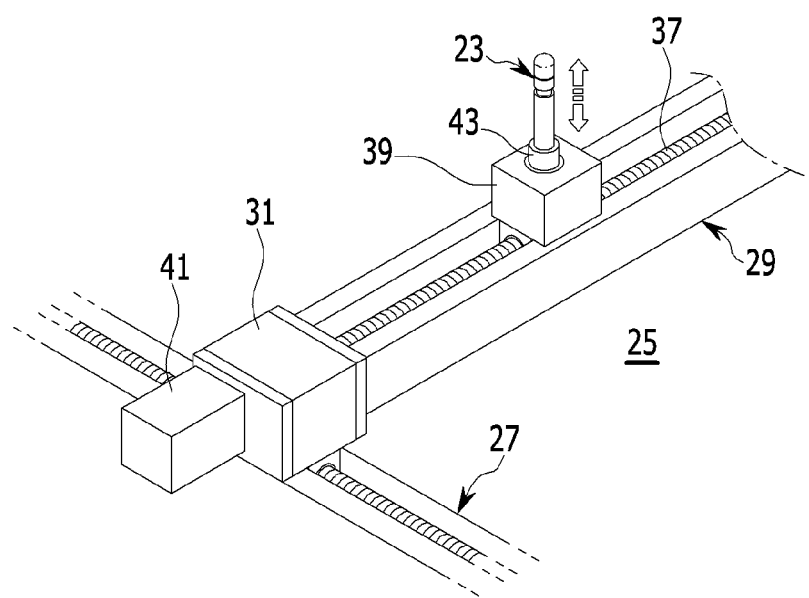
FIG. 4 is a partial enlarged view of a lower electrode applied to a spot welding system according to an exemplary embodiment of the present invention.

FIG. 3 is a top plan view of a lower moving unit applied to a spot welding system according to an exemplary embodiment of the present invention, and FIG. 4 is a partial enlarged view of a lower electrode applied to a spot welding system according to an exemplary embodiment of the present invention.

Referring to FIG. 1 and FIG. 3, the lower moving unit 5 is mounted welding process line separately from the upper moving unit 3, provided with a lower electrode 23 corresponding to the upper electrode 11. The lower moving unit 5 includes a table 25, a length direction moving member 27 and a width direction moving member 29. The table 25 may be, for example, installed on a floor of a welding process line.

The length direction moving members 27 may be disposed both ends of the table 52 along length direction of the table 25 and the each length direction moving member 27 includes a second moving block 31, a first (servo) motor 33 including an encoder and a first screw shaft 35. The each second moving block 31 is disposed on each of the first screw shafts 35 disposed along the length direction of the table 25.

Each of the first servo motors 33 transfers torque to each of the first screw shafts 35 respectively, and the second moving block 31 engaged with the first screw shaft 35 moves along the first screw shaft 35 by rotation of the first screw shaft 35.

As shown in the drawing, the first servo motor 33 as a pair may be disposed on the table 25 to supply torque each of the first screw shafts 35 respectively, or one first servo motor 33 may be used for drive the both first screw shafts 35.

The width direction moving member 29 may be connected with the second moving blocks 31 of the length direction moving member 27, moves along length direction of the table 25 with the second moving block 31, and the lower electrode 23 may be mounted thereto. The width direction moving member 29 may include a second screw shaft 37, a third moving block 39 and a second (servo) motor 41 including an encoder. The second screw shaft 37 may be connected with the each second moving blocks 31 along width direction of the table 25. The third moving block 39 may be engaged with the second screw shaft 37 and move along the second screw shaft 37 by rotation of the second screw shaft 37, and the lower electrode 23 may be mounted thereto.

Referring to FIG. 4, the lower electrode 23 may be mounted on the third moving block 39 through a cylinder 43 for moving up and down by operation of the cylinder 43. The lower electrode 23 may move up and down by the operation of the cylinder 43 corresponding height of welding points of the welding object P. The second (servo) motor 41 may be mounted to second moving block 31 of the length direction moving member 27, and transfer torque to the second screw shaft 37 for the third moving block 39 to move on the second screw shaft 37. The lower moving unit 5 may position the lower electrode 23 on table 25 by operating the length direction moving member 27 and width direction moving member 29.

Furthermore, in some exemplary embodiments of the present invention, the upper and lower moving units 3 and 5 may be configured to communicate with a controller 45 that is configured to control the operations of the upper and lower moving units 3 and 5.

In particular, the controller 45 synchronizes positions of the upper electrode 11 mounted to the upper moving unit 3 and lower electrode 23 mounted to the lower moving unit 5. Thus, the positions of the upper electrode 11 and the lower electrode 23 are synchronized for welding of the welding points of the welding object P.

The controller 45 may also include a first control portion 47 controlling the operation of the upper moving unit 3, a second control portion 49 controlling the operation of the lower moving unit 5, and a third control portion 51 synchronizing the positions of the upper and lower electrodes 11 and 23.

The third control portion 51 may be configured to detect signals from the encoders of the first and second servo motors 33 and 41, and then synchronizes positions of the upper and lower moving units 3 and 5 together with the first and second control portions 47 and 49 according to the detected signal. However, operations of the controller 45 can be executed by any means known to those skilled in the art, and thus detailed description will be omitted. Hereinafter, however, the specific operation method of the spot welding system 1 will be discussed.

The welding object P is inserted between the upper electrode 11 and the lower electrode 23. The positions of the upper and lower moving units 3 and 5 where the upper electrode 11 and lower electrode 23 are mounted respectively are synchronized by to the operation of the controller 45 and then the upper and lower moving units 3 and 5 of which the positions are synchronized by the controller 45 are moved to predetermined welding positions of the welding object P for welding.

In detail, the welding object P is supplied between the upper electrode 11 and the lower electrode 23 separated from the upper electrode 11 and then the controller 45 synchronizes the positions of the upper and lower moving units 3 and 5. In doing so, the positions of the upper electrode 11 and the lower electrode 23 correspond.

Next the controller 45 controls the operations of the upper and lower moving units 3 and 5 for the upper electrode 11 and the lower electrode 23 to be located to the predetermined welding positions of the welding object P repeatedly until the spot welding process is completed.

According to one or a plurality of the exemplary embodiments of the present invention, the upper electrode 11 and the lower electrode 23 are mounted to the upper and the lower moving units 3 and 5 separated from each other, and thus welding process may be implemented with at a high speed regardless of size of the welding object P. That is, a welding gun, connecting an upper electrode and a lower electrode 23, equipped to a conventional art is not used. And thus welding process may be implemented at high speeds regardless of size of the welding object P.

Also, numbers of robots required for welding process may be reduced, and also costs for facilities, maintenance expenditure, space for equipment and so on may be reduced. And Productivity and efficiency of welding may be improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A spot welding system comprising:
    an upper moving unit including an upper electrode and configured to vary a position of the upper electrode; and
    a lower moving unit mounted separately from the upper moving unit, having a lower electrode corresponding to the upper electrode, and configured to vary a position of the lower electrode.

2. The spot welding system of claim 1, wherein the upper moving unit comprises:
    a welding gun where the upper electrode is mounted through a pushing unit; and
    a robot where the welding gun is mounted, the robot configured to vary a position of the welding gun.

3. The spot welding system of claim 2, wherein the pushing unit comprises:
    a gear box mounted to the welding gun;
    a pushing actuator mounted to a lower portion of the gear box; and
    a first moving block where the upper electrode is mounted, the first moving block mounted to the lower portion of the gear box, and disposed to selectively move up and down due to an operation of the pushing actuator.

4. The spot welding system of claim 1, wherein the lower moving unit comprises:
    a table;
    length direction moving members disposed on both ends of the table along length direction of the table; and
    a width direction moving member connected to the length direction moving member and disposed and configured to be moved along the length direction of the table by an operation of the length direction moving members, of which the lower electrode is mounted thereto, wherein the width direction moving member is movable along width direction of the table.

5. The spot welding system of claim 4, wherein the length direction moving member comprises:
    a first screw shaft disposed along each length direction side of the table;
    a second moving block engaged with and movable along each length direction side of the table via the first screw shaft; and
    a first motor mounted to a side of the table and configured and disposed to selectively rotate the first screw shaft on each length direction side of the table.

6. The spot welding system of claim 5, wherein the first motor is mounted to supply torque to the first screw shaft along each length direction side of the table respectively.

7. The spot welding system of claim 5, wherein the width direction moving member comprises:
    a second screw shaft connected with each second moving block along the width direction of the table;
    a third moving block engaged with and movable along the second screw shaft, wherein the lower electrode is mounted to the third moving block; and
    a second motor mounted to the third moving block and disposed and configured to selectively rotate the second screw shaft.

8. The spot welding system of claim 7, wherein the lower electrode is mounted to the third moving block through a cylinder to selectively move up and down the lower electrode.

9. The spot welding system of claim 7, wherein the second motor is a servo motors.

10. The spot welding system of claim 1, wherein the upper and lower moving units are configured to communicate a controller configured to control operations of the upper and lower moving units.

11. The spot welding system of claim 10, wherein the controller is configured to synchronize positions of the upper electrode and lower electrode.

12. The spot welding system of claim 11, wherein the controller is configured to detect signals from an encoder of the first and second motors, and then synchronize the positions of the upper and lower moving units according to the detected signal.

13. The spot welding system of claim 1, wherein the first motor is a servo motor.

14. The spot welding system of claim 1, wherein the first motor is a pair of servo motors.

15. A operation method for a spot welding system including an upper moving unit provided with an upper electrode and varying a position of the upper electrode and a lower moving unit mounted separately from the upper moving unit, provided with a lower electrode corresponding to the upper electrode, and varying a position of the lower electrode, the operation method for a spot welding system comprising:
    disposing a welding object between the upper electrode and the lower electrode;
    synchronizing positions of the upper and lower moving units by a controller configured to control operation of the upper moving unit and the lower moving unit; and
    moving the upper and lower moving units of which the positions are synchronized by the controller to welding points of the welding object for welding.

* * * * *